(12) United States Patent
Robel

(10) Patent No.: US 8,789,367 B2
(45) Date of Patent: **\*Jul. 29, 2014**

(54) SYSTEM FOR RECOVERING ENGINE EXHAUST ENERGY

(75) Inventor: Wade J. Robel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/346,268

(22) Filed: Jan. 9, 2012

(65) Prior Publication Data

US 2012/0102947 A1    May 3, 2012

Related U.S. Application Data

(63) Continuation of application No. 12/078,416, filed on Mar. 31, 2008, now Pat. No. 8,091,357.

(51) Int. Cl.
  *F02D 23/00*    (2006.01)
  *F02B 33/44*    (2006.01)

(52) U.S. Cl.
  USPC ............. 60/600; 60/597; 60/612; 123/562

(58) Field of Classification Search
  USPC .......... 60/597, 598, 600, 612; 123/559.1, 562
  See application file for complete search history.

(56) References Cited

U.S. PATENT DOCUMENTS

| | | |
|---|---|---|
| 1,634,797 A | 7/1927 | Newton |
| 1,849,170 A | 3/1932 | Buchi |
| 1,895,538 A | 1/1933 | Büchi |
| 2,979,887 A | 4/1961 | Homola et al. |
| 3,941,104 A | 3/1976 | Egli |
| 4,235,076 A | 11/1980 | Meloche et al. |
| 4,535,592 A | 8/1985 | Zinsmeyer |
| 4,785,630 A | 11/1988 | Dorsch |
| 4,860,709 A | 8/1989 | Clarke et al. |
| 4,959,961 A | 10/1990 | Hiereth |
| 5,050,384 A | 9/1991 | Crockett |

(Continued)

FOREIGN PATENT DOCUMENTS

| | | |
|---|---|---|
| DE | 10243473 A1 | 3/2004 |
| DE | 102005039012 A1 | 2/2007 |

(Continued)

OTHER PUBLICATIONS

Nebojsa Milovanovic and Jamie Turner, Requirements for the Valve Train and Technologies for Enabling HCCI Over the Entire Operating Range [online], Sep. 20, 2005, 22 pages, Retrieved from the Internet: URL: http://www1.eere.energy.gov/vehiclesandfuels/pdfs/deer_2005/session7/2005_deer_milovanovic.pdf.

(Continued)

*Primary Examiner* — Mary A Davis
(74) *Attorney, Agent, or Firm* — Finnegan, Henderson, Farabow, Garrett & Dunner LLP

(57) ABSTRACT

A system for recovering, engine exhaust energy is provided. The system includes an exhaust system including a first exhaust branch and a second exhaust branch. The system includes a first and a second group of exhaust valves associated with a plurality of engine cylinders. The system also includes an energy recovering assembly. The system further includes a control mechanism configured to control at least one of the first and second groups of exhaust valves according to a determined timing strategy based on at least one engine operating parameter.

5 Claims, 10 Drawing Sheets

(56) References Cited

U.S. PATENT DOCUMENTS

| | | |
|---|---|---|
| 5,079,913 A | 1/1992 | Kishishita |
| 5,090,204 A | 2/1992 | Bonitz et al. |
| 5,417,068 A | 5/1995 | Olofsson |
| 5,704,210 A | 1/1998 | Wang |
| 5,857,336 A | 1/1999 | Paul |
| 6,276,138 B1 | 8/2001 | Welch |
| 6,286,312 B1 | 9/2001 | Bertilsson |
| 6,321,552 B1 | 11/2001 | Frederiksen |
| 6,347,619 B1 | 2/2002 | Whiting et al. |
| 6,378,308 B1 | 4/2002 | Pflüger |
| 6,415,600 B1 | 7/2002 | Lejon |
| 6,438,956 B1 | 8/2002 | Olofsson |
| 6,460,337 B1 | 10/2002 | Olofsson |
| 6,595,183 B1 | 7/2003 | Olofsson |
| 6,694,736 B2 | 2/2004 | Pflüger |
| 6,883,319 B2 | 4/2005 | Ekenberg |
| 7,383,684 B2 | 6/2008 | Vuk |
| 7,509,805 B2 | 3/2009 | Karlsson |
| 7,540,151 B2 | 6/2009 | Boehm et al. |
| 7,587,898 B2 | 9/2009 | Turner |
| 8,091,357 B2 * | 1/2012 | Robel ............... 60/600 |
| 2002/0078934 A1 | 6/2002 | Hohkita et al. |
| 2006/0021347 A1 * | 2/2006 | Sun et al. ............... 60/612 |
| 2006/0070381 A1 | 4/2006 | Parlow et al. |
| 2007/0119168 A1 | 5/2007 | Turner |
| 2007/0130948 A1 | 6/2007 | Boehm et al. |
| 2009/0223220 A1 | 9/2009 | Vuk |
| 2011/0000470 A1 | 1/2011 | Roth |

FOREIGN PATENT DOCUMENTS

| | | | |
|---|---|---|---|
| GB | 2420377 A | 5/2006 | |
| GB | 2423797 A | 9/2006 | |
| JP | 59128920 A | 7/1984 | |
| JP | 61164039 A * | 7/1986 | ............... F02B 37/00 |
| JP | 63009616 A * | 1/1988 | ............... F01N 5/04 |
| WO | WO 2005 068803 A1 | 7/2005 | |

OTHER PUBLICATIONS

Presentation at Deer, 2007, Requirements for the Valve Train and Technolgies for Enabling HCCI Over the Entire Operating Range, 2005 http://www1.eere.energy.gov/vehiclesandfuels/pdfs/deer_2005/session7/2005_deer_milovanovic.pdf.

* cited by examiner

SYSTEM FOR RECOVERING ENGINE EXHAUST ENERGY

This application is a continuation of application Ser. No. 12/078,416, filed Mar. 31, 2008 now U.S. Pat. No. 8,091,357.

TECHNICAL FIELD

The present disclosure relates generally to a system and, more particularly, to a system for recovering engine exhaust energy.

BACKGROUND

Machines such as wheel loaders, excavators, off-highway vehicles, locomotives, power generators, and the like, are typically equipped with an engine system including a combustion engine to produce power. The combustion engine may be associated with an air intake system configured to draw air into a combustion chamber of the engine for combustion, and an exhaust system for discharging, exhaust gases produced after the combustion to the atmosphere. The combustion engine typically includes a number of engine cylinders, each associated with a combustion chamber having a number of valves, such as, intake valves and exhaust valves. Typically, intake valves are connected with the air intake system, and may open and close to allow and block air flow from the air intake system to the cylinders. Exhaust valves are typically connected with an exhaust manifold, or exhaust common rail, in the exhaust system to discharge exhaust gases. Exhaust valves may open and close to allow and block exhaust gas flow from the combustion chamber to the exhaust manifold. During an engine cycle, the intake valves and the exhaust valves may be opened and closed at determined times.

Under some circumstances, a boost in engine power may be demanded by the machine to which the engine is providing power. For example, more power may be demanded when a mobile machine undergoes a sudden acceleration, or when the mobile machine needs to overcome a large load, etc. In order to obtain additional power from an existing engine system without modifying the engine capacity, energy recovering assemblies may be utilized to recover energy which could otherwise be wasted from exhaust gases. Such energy recovering assemblies may include turbo compounding devices, turbochargers, and exhaust waste heat recovery devices. Both turbo compounding devices and turbochargers receive exhaust gases to drive an associated turbine, thereby converting the kinetic energy of the exhaust gases into the mechanical energy of the turbine, which may be utilized by other devices such as a compressor to compress air. Exhaust waste heat recovery devices can recover thermal energy from the heat of exhaust gases, and convert the thermal energy into other forms of energy, such as mechanical or electrical energy. Use of exhaust waste heat recovery devices may improve overall efficiency of the engine.

A turbo compounding device typically includes a turbine and a power coupling device. When exhaust gases from the engine reach the turbine, the exhaust gas flow can cause the turbine to rotate. Thus, the kinetic energy of the exhaust gases can be converted into the mechanical rotating energy of the turbine. Through a power coupling device, which may share a common rotating shaft with the turbine, the energy of the rotating turbine can be coupled with a drive output device of the engine, adding additional power to the total engine power output. A typical power coupling device may be mechanical, and may include a number of gears that couple the rotating turbine with a crankshaft of the engine. However, a power coupling device may also be electrical, converting the rotating mechanical energy of the turbine into electrical energy.

A typical turbocharger includes a turbine and a compressor drivingly connected with each other through a common rotating shaft. The exhaust gases from the engine drive the turbine to rotate, which in turn causes the compressor to rotate through the common rotating shaft. The rotating compressor then draws air from the atmosphere, compresses the air, and drives the compressed air into the air intake system of the engine. With the air being compressed, more air and fuel can be drawn into the engine for combustion during an engine cycle. As a result, more power can be produced by the combustion engine.

When a turbo compounding device or a turbocharger is used to recover energy from exhaust gases, the turbine of such devices may generate a back pressure, forming a resistance against the exhaust gas flow. This back pressure may affect the performance of the engine. Under some circumstances, high back pressure created by the turbine can adversely affect engine performance. For example, due to the resistance of turbine back pressure, an increased amount of exhaust residual may be left in the combustion chamber (i.e., the cylinder) during an exhaust stroke of an engine cycle. As a result, pumping work of the piston may be increased, and energy may be lost in the increased pumping work. Furthermore, increased exhaust residual in the combustion chamber also occupies space, resulting in a reduced amount of air taken into the chamber during an air intake stroke. With less air for combustion, less power is produced in a normal engine cycle, which may result in reduced engine combustion efficiency.

Under other circumstances, high back pressure can be beneficial during an engine cycle, and therefore may be desirable. For example, high back pressure created by the turbine may help increase the positive work done by the piston during an expansion stroke. During engine blow down, when the exhaust valves open during the late portion of the expansion stroke, the high back pressure may act on the piston and increase engine power output.

An internal combustion engine with a system for controllably opening and closing exhaust and intake valves is described in U.S. Pat. No. 6,460,337 (the '337 patent) issued to Olofsson on Oct. 8, 2002. The system disclosed in the '337 patent includes an engine with a plurality of engine cylinders each including exhaust and intake valves, and a turbocharger to utilize energy of exhaust gases to compress air. The exhaust valves are divided into a first and a second group of exhaust valves connected by respective first and second exhaust manifolds. The first exhaust manifold directs exhaust gases from the first group of exhaust valves to a turbine of the turbocharger, and the second exhaust manifold directs exhaust gases from the second group of exhaust valves to a catalyst through an exhaust pipe.

While the '337 patent may provide an improved internal combustion engine, the improvement is mainly achieved through effective air charging by utilizing the turbocharger when engine speed increases. To do so, the times for opening/closing the intake and exhaust valves are changed such that the temperature increase resulting from compression in the cylinders is reduced. With such a reduction in the temperature increase, engine combustion efficiency may be improved. However, when considering exhaust energy recovery, the system of the '337 patent may have drawbacks. The system of the '337 patent only includes a single turbocharger to recover energy from the exhaust gases for supercharging, and does not disclose any other exhaust energy recovery devices, such as turbo compounding systems. Therefore, the efficiency of exhaust energy recovery by the system may be limited. Furthermore, although the system includes divided exhaust-gas discharge through the first and second groups of exhaust valves, the portion of exhaust gases from the second group of exhaust valves is simply discharged through the exhaust pipe without passing through any energy recovery devices. This portion, which could contain a significant amount of the total energy produced during an engine cycle, is thus wasted in the system of the '337 patent.

The system and method of the present disclosure are directed toward improvements in the existing technology.

SUMMARY

In one aspect, the present disclosure is directed to a system for recovering engine exhaust energy. The system includes an exhaust system including a first exhaust branch and a second exhaust branch. The system includes a first and a second group of exhaust valves associated with a plurality of engine cylinders. The system also includes an energy recovering assembly. The system further includes a control mechanism configured to control at least one of the first and second groups of exhaust valves according to a determined timing strategy based on at least one engine operating parameter.

In another aspect, the present disclosure is directed to a method of recovering engine exhaust energy. The method includes directing exhaust gases from a plurality of engine cylinders through a first group of exhaust valves and into a first exhaust branch of an exhaust system. The method includes directing exhaust gases from the plurality of engine cylinders through a second group of exhaust valves and into a second exhaust branch of the exhaust system. The method also includes recovering energy from the exhaust gases in at least one of the first and second exhaust branches by an energy recovering assembly. The method further includes controlling at least one of the first and second groups of exhaust valves according to a determined timing strategy based on at least one engine operating parameter.

DETAILED DESCRIPTION

Figure 1:
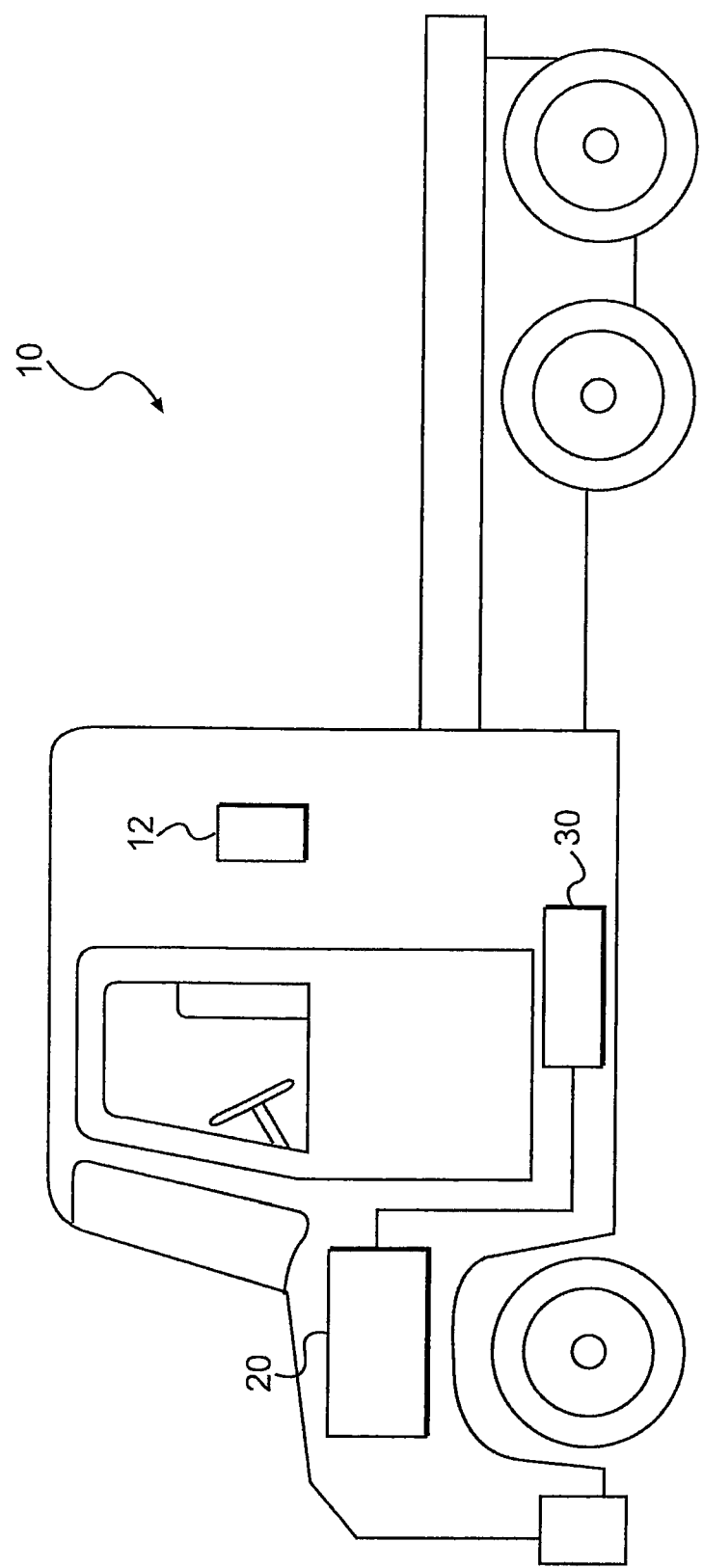
FIG. 1 is a schematic illustration of an exemplary machine in which the disclosed system may be employed.

FIG. 1 schematically illustrates an exemplary machine 10. Machine 10 may be an on- or off-highway truck, a wheel loader, a track-type tractor, an excavator, a locomotive, a power generator, or any type of machine in which the disclosed system may be employed. Machine 10 may include an engine system 20 in accordance with the disclosed embodiments herein. Machine 10 may further include a transmission system 30 configured to transmit engine power to other components of the machine 10, and an exhaust system 12 to treat exhaust gases after engine combustion.

FIGS. 2-9 diagrammatically illustrate exemplary embodiments of an engine system having a system for recovering engine exhaust energy according to the disclosure. In order to simplify the disclosure and reference to the several diagrammatic illustration, the same reference numerals are used throughout FIGS. 2-9 to refer to the same or similar components.

Figure 2:
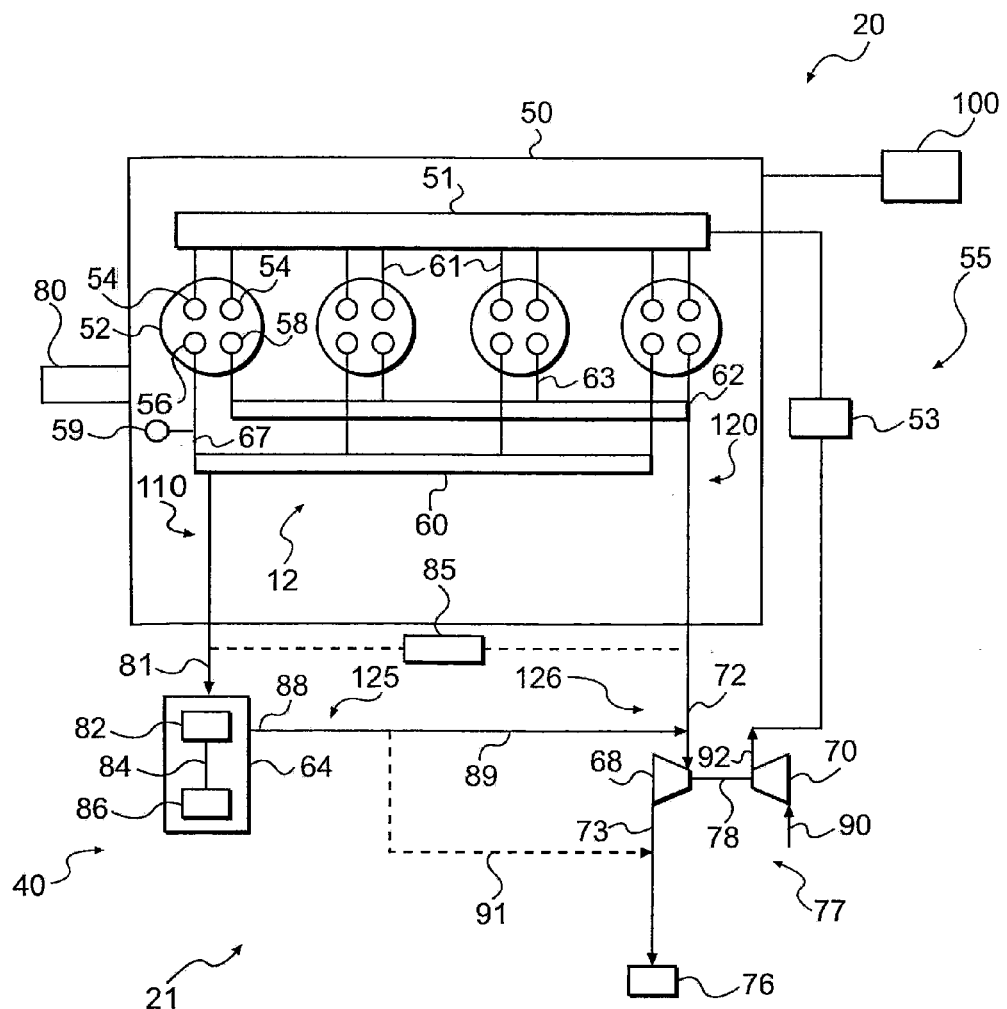
FIG. 2 is a diagrammatic representation of an engine system having a system for recovering engine exhaust energy in accordance with an embodiment.

FIG. 2 diagrammatically illustrates an exemplary engine system 20 having an exhaust energy recovering assembly 40 in accordance with an embodiment. The engine system 20 may include an engine 50, which may be an internal combustion engine including an air intake system 55, the exhaust system 12, and a drive output device 80 configured to output power produced by the engine 50 to drive the machine 10. The engine 50 may be a spark ignited gasoline engine, a spark ignited natural gas engine, a diesel engine, or any other suitable engine, which combusts a mixture of fuel and air to produce power. The drive output device 80 may be, for example, a crankshaft or any other suitable device. The engine system 20 may include a system 21 for recovering engine exhaust energy.

The air intake system 55 may include an air intake manifold 51 and a cooling unit 53. The cooling unit 53 may be an air-to-air cooler, an air-to-liquid cooler, or any other suitable type of cooler configured to reduce the temperature of air. It is apparent to a person skilled in the art that the air intake system 55 may include various other components not shown in FIG. 2. For example, an air filter may be located upstream of the cooling unit 53 in the air flow. The cooling unit 53 may be located upstream of the air intake manifold 51 in the intake air flow. The exhaust system 12 may include a first exhaust branch 110, a second exhaust branch 120, an exhaust gas treatment device 76, and a plurality of passageways 63, 67. In some embodiments, the first exhaust branch 110 may be configured to receive a flow of exhaust gases with relatively high pressure, while the second exhaust branch 120 may be configured to receive a flow of exhaust gases with relatively low pressure. Although not shown in FIG. 2, the exhaust gas treatment device 76 may include a muffler or silencer, one or more catalytic converters, etc.

The engine 50 may include a plurality of engine cylinders 52 associated with a plurality of air intake valves 54, a first group of exhaust valves 56, and a second group of exhaust valves 58. The first group of exhaust valves 56 and the second group of exhaust valves 58 may both be used to discharge exhaust gases from the cylinder 52, and may be designed to be substantially similar to each other. It is contemplated that the first group of exhaust valves 56 and the second group of exhaust valves 58 may also be designed to be substantially different from each other. Each engine cylinder 52 may be associated with a combustion chamber. The air intake valves 54 may be connected via passageways 61 to the air intake manifold 51.

The system 21 for recovering engine exhaust energy may include the exhaust system 12, which may include the first exhaust branch 110, the second exhaust branch 120, and the exhaust gas treatment device 76. The system 21 may also include the first group of exhaust valves 56 and the second group of exhaust valves 58 associated with the plurality of engine cylinders 52. According to some embodiments, as illustrated in FIG. 2, the system 21 may also include a first exhaust manifold 60 in the first exhaust branch 110. The first exhaust manifold 60 may be in fluid communication with the first group of exhaust valves 56, for example, through passageways 67. The system 21 may also include a second exhaust manifold 62 in the second exhaust branch 120. The second exhaust manifold 62 may be in fluid communication with the second group of exhaust valves 58, for example, through passageways 63. Passageways 67 and 63, as well as any other exhaust system passageways, may include pipes, conduits, ducts, and/or other suitable flow paths for exhaust gas. Exhaust gases produced by the engine 50 may be directed from the plurality of engine cylinders 52 through the first group of exhaust valves 56 and into the first exhaust manifold 60 in the first exhaust branch 110. Exhaust gases may also be directed from the plurality of engine cylinders 52 through the second group of exhaust valves 58 and into the second exhaust manifold 62 in the second exhaust branch 120.

The exhaust energy recovering assembly 40 may be located in at least the first exhaust branch 110. In some embodiments, the exhaust energy recovering assembly 40 may also be located in the second exhaust branch 120. The exhaust energy recovering assembly 40 may receive exhaust gases from the first exhaust manifold 60 or the second exhaust manifold 62, and may be configured to recover energy from the exhaust gases. The exhaust energy recovering assembly 40 may include, for example, a turbo compounding device, a turbocharger, or both a turbo compounding device and a turbocharger. The exhaust energy recovering assembly 40 may further include an exhaust waste heat recovery device.

As shown in FIG. 2, the exhaust energy recovering assembly 40 may include a turbo compounding device 64 located downstream of the first exhaust manifold 60 in the first exhaust branch 110 and a turbocharger 77 located downstream of the second exhaust manifold 62 in the second exhaust branch 120. The turbo compounding device 64 may include a turbine 82 and a power coupling device 86 connected with each other, for example, through a common rotating shaft 84. The turbo compounding device 64 may include an inlet 81 through which the turbine 82 may receive exhaust gases from the first exhaust manifold 60, and an outlet 88 through which exhaust gases may be directed to other components of the exhaust system 12.

The power coupling device 86 may be mechanical or electrical in nature. A mechanical type power coupling device 86 may include a plurality of gears (not shown) coupled with the drive output device 80 of the engine 50, which may be a crankshaft, or other device known in the art. Alternatively, energy of the rotating turbine 82 may be converted into electrical power through an electrical type power coupling device 86, for example, a generator. It is contemplated that the power coupling device 86 may be any other suitable type of device that converts mechanical energy of the turbine 82 into another form of energy.

The turbocharger 77 may include a turbine 68 and a compressor 70 drivingly connected with each other by a common rotating shaft 78. The turbine 68 may be located in the second exhaust branch 120 downstream of the second exhaust manifold 62 and upstream of the exhaust gas treatment device 76. The turbine 68 may include an inlet 72 and an outlet 73. The inlet 72 may be connected with the second exhaust manifold 62 to receive exhaust gases, and the outlet 73 may be connected with the exhaust gas treatment device 76 to discharge exhaust gases for further treatment. Exhaust gases received by the turbine 68 through the inlet 72 may drive the turbine 68 to rotate, which in turn may cause the compressor 70 to rotate through the common rotating shaft 78.

The compressor 70 may include an inlet 90 and an outlet 92. The inlet 90 may draw air from the atmosphere, and may be connected with other components, such as an air filter (not shown) configured to clean the air drawn from the atmosphere. The outlet 92 of the compressor 70 may be connected with other downstream components of the air intake system 55, such as the cooling unit 53 in an air flow path. The rotating compressor 70 may compress the air drawn from the atmosphere, and direct the compressed air to the downstream air intake system 55. The cooling unit 53 may reduce the temperature of the compressed air before it enters the air intake manifold 51.

The first exhaust branch 110 may include a first portion 125 in fluid communication with a second portion 126 of the second exhaust branch 120. Exhaust gases may be directed from the first portion 125 of the first exhaust branch 110 to the second portion 126 of the second exhaust branch 120. The first portion 125 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the turbine 68 of the turbocharger 77, or downstream of the turbine 68 of the turbocharger 77 and upstream of the exhaust gas treatment device 76. FIG. 2 shows exemplary connections between the first portion 125 and the second portion 126 through a passageway 89, or through a passageway 91.

In some embodiments, the system 21 may include a valve 85 interposed between the first exhaust branch 110 and the second exhaust branch 120. For example, the valve 85 may be connected with the first exhaust branch 110 downstream of the first exhaust manifold 60 and upstream of the inlet 81 of the turbo compounding device 64, and the second exhaust branch 120 downstream of the second exhaust manifold 62 and upstream of the inlet 72 of the turbine 68. When the valve 85 opens, the exhaust gases from the first exhaust branch 110, where pressure of exhaust gases may be relatively high, may be directed into the second exhaust branch 120, where pressure of the exhaust gases may be relatively low.

Figure 3:
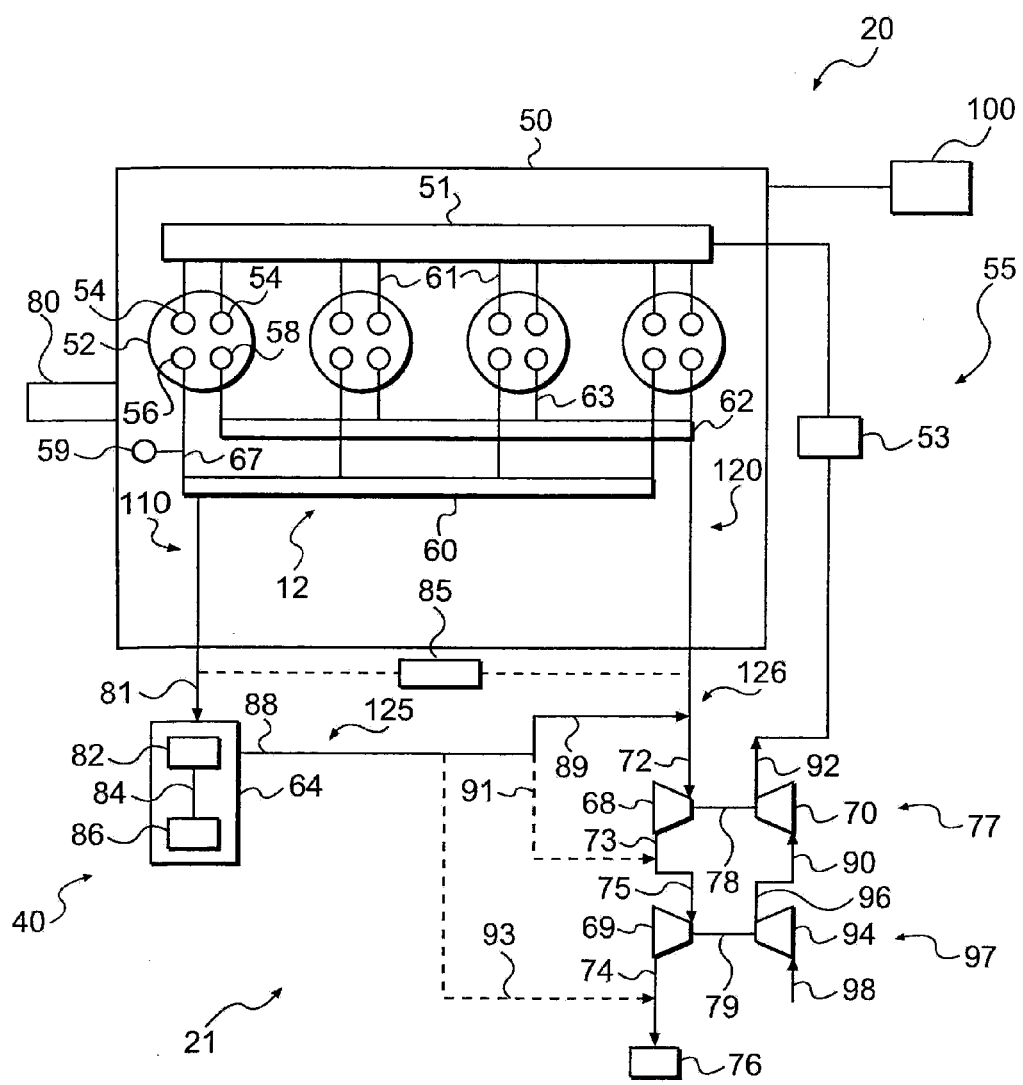
FIG. 3 is a diagrammatic representation of an engine system having a system for recovering engine exhaust energy in accordance with another embodiment.

FIG. 3 diagrammatically illustrates an exemplary engine system 20 having a system 21 for recovering engine exhaust energy in accordance with another embodiment. In this embodiment, the engine system 20 may include the engine 50, the system 21, and other components similar to those shown in FIG. 2. The energy recovering assembly 40 may include the turbo compounding device 64 located in the first exhaust branch 110 downstream of the first exhaust manifold 60. The energy recovering assembly 40 may also include a first turbocharger 77 including a first turbine 68 and a first compressor 70, and a second turbocharger 97 including a second turbine 69 and a second compressor 94. The first turbine 68 may be located downstream of the second exhaust manifold 62. The second turbine 69 may be located downstream of the first turbine 68 and upstream of the exhaust gas treatment device 76. The first compressor 70 may be drivingly connected with the first turbine 68 through a first common rotating shaft 78. The second compressor 94 may be drivingly connected with the second turbine 69 through a second common rotating shaft 79.

The first turbine 68 may include an inlet 72 and an outlet 73. The inlet 72 may be connected to the second exhaust manifold 62 to receive exhaust gases. The second turbine 69 may include an inlet 75 and an outlet 74. The inlet 75 may be connected with the outlet 73 of the first turbine 68, and the outlet 74 may be connected with the downstream exhaust gas treatment device 76. The first compressor 70 may include an inlet 90 and an outlet 92. The outlet 92 may be connected with an air intake system component, such as the cooling unit 53. The second compressor 94 may include an inlet 98 and an outlet 96. The outlet 96 may be connected with the inlet 90 of the first compressor 70. The inlet 98 may draw air from the atmosphere, and may be connected with other components, such as an air filter (not shown).

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the turbine 68 of the first turbocharger 77, or downstream of the turbine 68 of the first turbocharger 77 and upstream of the turbine 69 of the second turbocharger 97, or downstream of the turbine 69 of the second turbocharger 97 and upstream of the exhaust gas treatment device 76. FIG. 3 shows exemplary connections between the first portion 125 and the second portion 126 through a passageway 89, through a passageway 91, or through a passageway 93.

It is contemplated that in some embodiments, there may be a second cooling unit interposed between the outlet 96 of the second compressor 94 and the inlet 90 of the first compressor 70 to reduce air temperature after the air is compressed by the second compressor 94. In some embodiments, the system 21 may further include a valve 85 interposed between the first exhaust branch 110 and the second exhaust branch 120. For example, the valve 85 may be connected with the first exhaust branch 110 downstream of the first exhaust manifold 60 and upstream of the inlet 81 of the turbo compounding device 64, and the second exhaust branch 120 downstream of the second exhaust manifold 62 and upstream of the inlet 72 of the first turbine 68.

Figure 4:
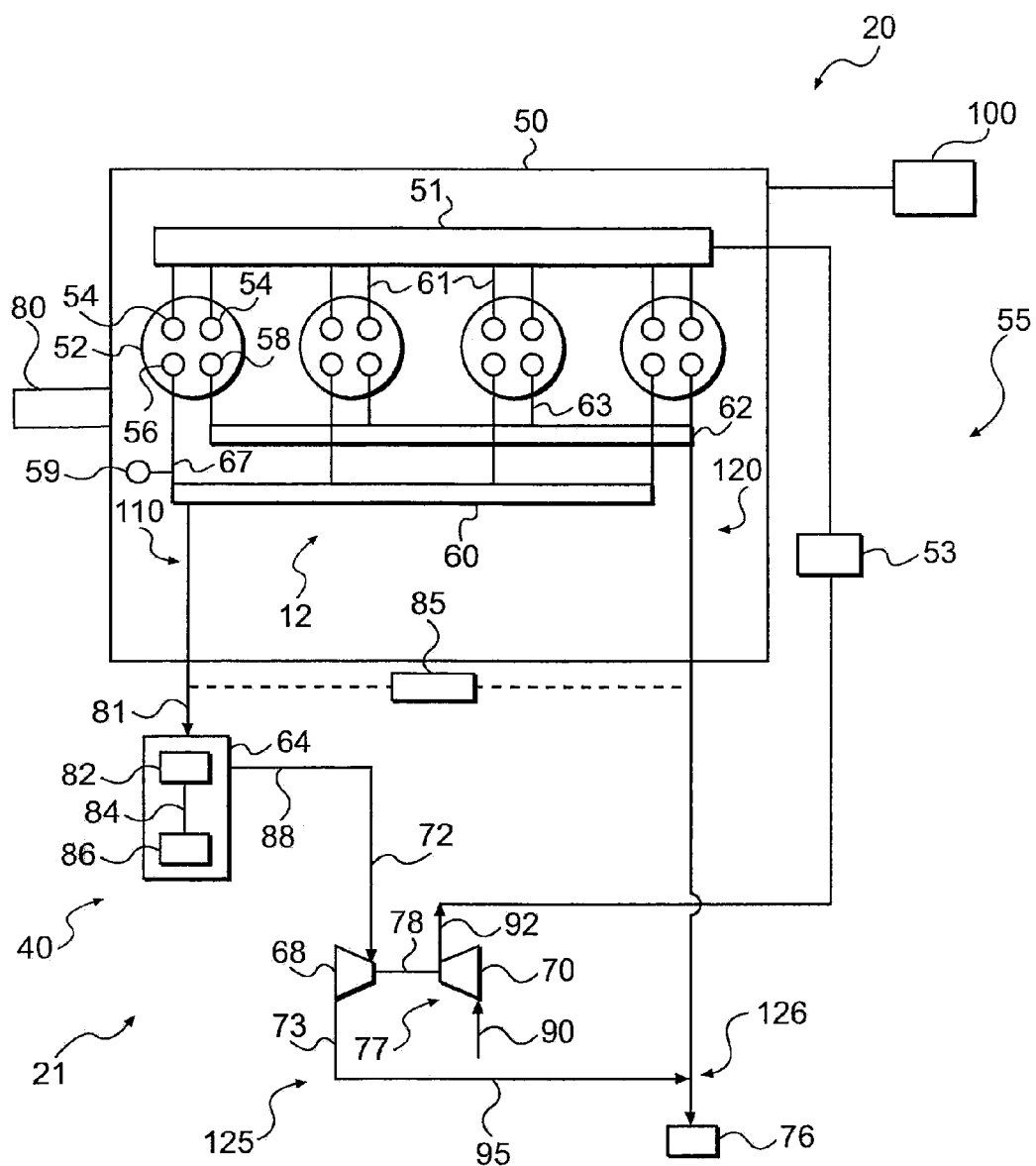
FIG. 4 is a diagrammatic representation of an engine system having a system for recovering engine exhaust energy in accordance with another embodiment.

FIG. 4 diagrammatically illustrates an exemplary engine system 20 having a system 21 for recovering engine exhaust energy in accordance with another embodiment. As shown in FIG. 4, the engine system 20 may include the engine 50, the system 21, and components similar to those shown in FIG. 2. The energy recovering assembly 40 may include the turbo compounding device 64 located in the first exhaust branch 110 downstream of the first exhaust manifold 60, and the turbocharger 77 having the turbine 68 and the compressor 70. The exhaust gas treatment device 76 may be located downstream of the second exhaust manifold 62.

The turbine 68 of the turbocharger 77 may be located downstream of the turbo compounding device 64 and upstream of the exhaust gas treatment device 76. The inlet 72 of the turbine 68 may be connected with the outlet 88 of the turbo compounding device 64. The outlet 73 of the turbine 68 may be connected with the exhaust gas treatment device 76. The inlet 90 of the compressor 70 may draw air from the atmosphere and may be connected with other components, such as an air filter (not shown). The outlet 92 of the compressor 70 may be connected with other air intake system components, such as the cooling unit 53. The second exhaust branch 120 may include the second group of exhaust valves 58, the second exhaust manifold 62, and the downstream exhaust gas treatment device 76.

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 68 of the turbocharger 77 at the outlet 73. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the exhaust gas treatment device 76. FIG. 4 shows an exemplary connection between the first portion 125 and the second portion 126 through a passageway 95.

The system 21 may further include a valve 85 interposed between the first exhaust branch 110 and the second exhaust branch 120. For example, the valve 85 may be connected with a portion of the first exhaust branch 110 downstream of the first exhaust manifold 60 and upstream of the inlet 81 of the turbo compounding device 64, and a portion of the second exhaust branch 120 downstream of the second exhaust manifold 62 and upstream of the exhaust gas treatment device 76. Alternatively, the portion in the first exhaust branch 110 may be located downstream of the outlet 88 of the turbo compounding device 64 and upstream of the inlet 72 of the turbine 68.

Figure 5:
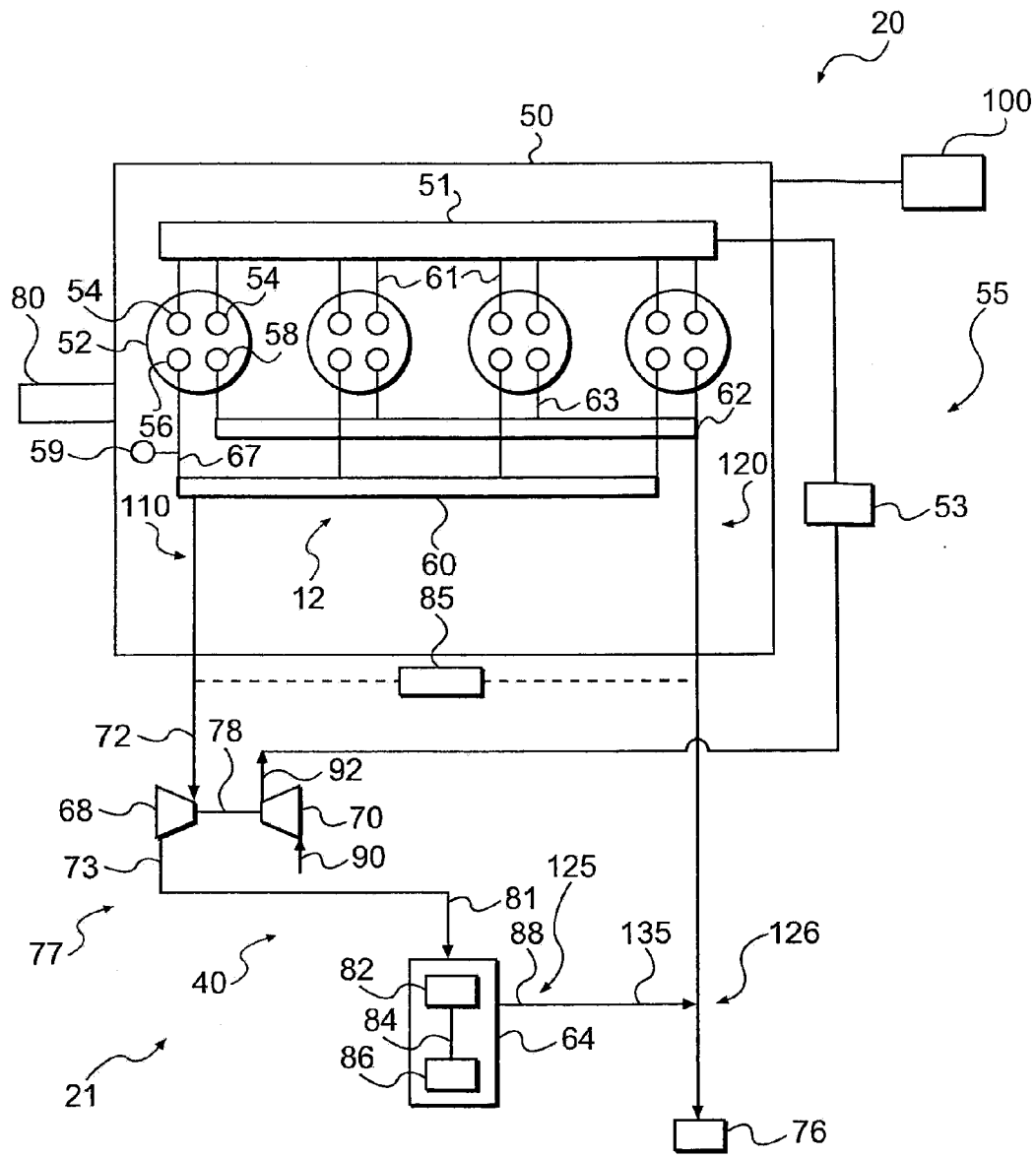
FIG. 5 is a diagrammatic representation of an engine system having a system for recovering engine exhaust energy in accordance with another embodiment.

FIG. 5 diagrammatically illustrates an exemplary engine system 20 having a system 21 for recovering engine exhaust energy in accordance with another embodiment. In FIG. 5, the engine system 20 may include the engine 50, the system 21, and components similar to those shown in FIG. 2. For example, the engine system 20 may include the exhaust gas treatment device 76 located downstream of the second exhaust manifold 62. The energy recovering assembly 40 may include the turbocharger 77 including the turbine 68 and the compressor 70. The turbine 68 may be located in the first exhaust branch 110 downstream of the first exhaust manifold 60. The energy recovering assembly 40 may also include the turbo compounding device 64 located downstream of the turbine 68 of the turbocharger 77. The inlet 72 of the turbine 68 may be connected with the first exhaust manifold 60 to receive high pressure exhaust gases. The inlet 81 of the turbo compounding device 64 may be connected with the outlet 73 of the turbine 68. The outlet 88 of the turbo compounding device 64 may be connected with the exhaust gas treatment device 76.

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the exhaust gas treatment device 76. FIG. 5 shows an exemplary connection between the first portion 125 and the second portion 126 through a passageway 135.

The system 21 may further include a valve 85 interposed between the first exhaust branch 110 and the second exhaust branch 120. For example, the valve 85 may be connected with the first exhaust branch 110 downstream of the first exhaust manifold 60 and upstream of the inlet 72 of the turbine 68, and the second exhaust branch 120 downstream of the second exhaust manifold 62 and upstream of the exhaust gas treatment device 76.

Figure 6:
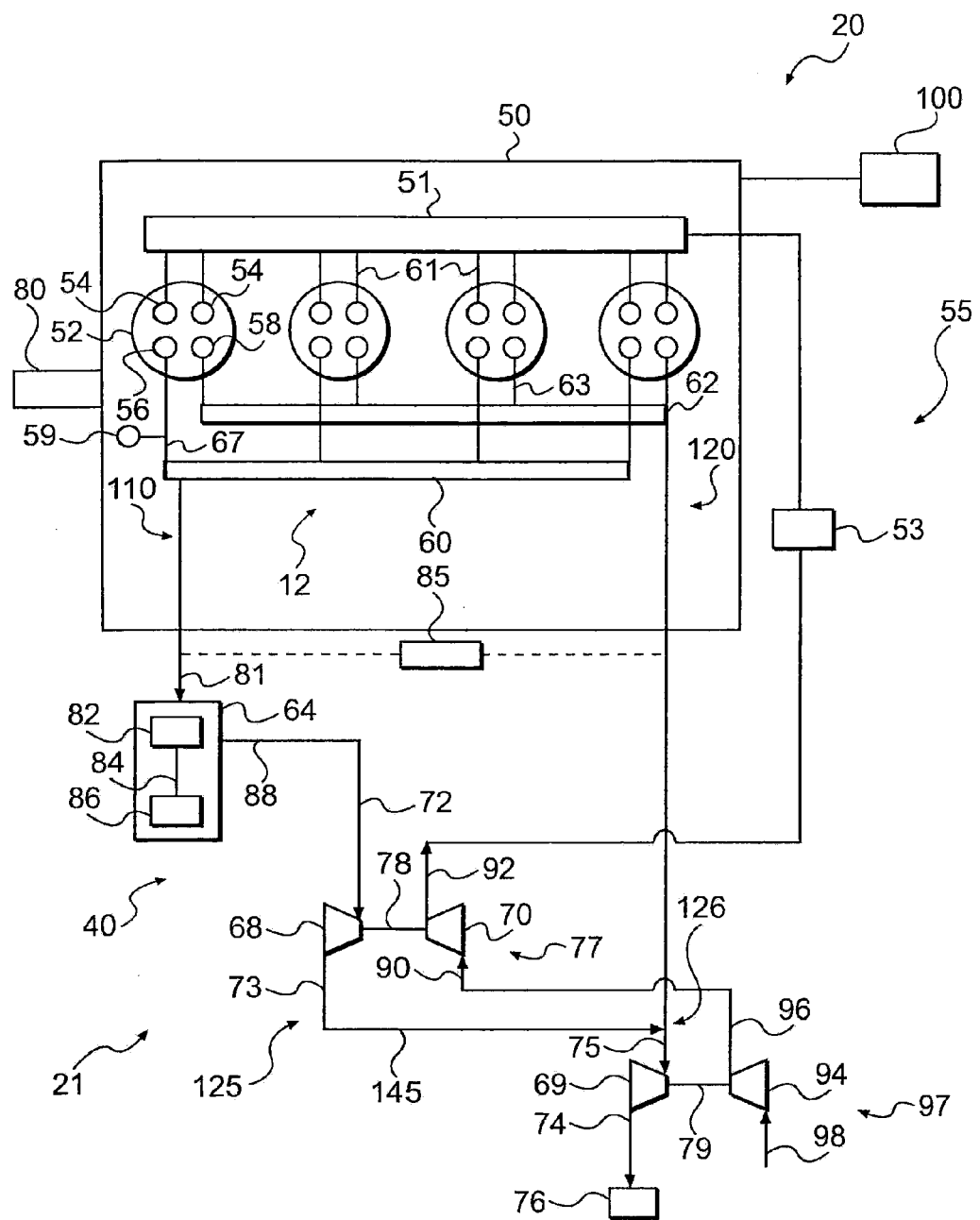
FIG. 6 is a diagrammatic representation of an engine system having a system for recovering engine exhaust energy in accordance with another embodiment.

FIG. 6 diagrammatically illustrates an exemplary engine system 20 having a system 21 for recovering engine exhaust energy in accordance with another embodiment. The engine system 20 may include the engine 50, the system 21, and components similar to those illustrated in FIG. 3. For example, the energy recovering assembly 40 may include the turbo compounding device 64 located in the first exhaust branch 110 downstream of the first exhaust manifold 60. The inlet 81 of the turbo compounding device 64 may be connected with the first exhaust manifold 60. The energy recovering assembly 40 may also include the first turbocharger 77 including the first turbine 68 and the first compressor 70, and the second turbocharger 97 including the second turbine 69 and the second compressor 94.

The first turbine 68 may be located downstream of the turbo compounding device 64. The inlet 72 of the first turbine 68 may be connected with the outlet 88 of the turbo compounding device 64. The second turbine 69 may be located downstream of the first turbine 68. The inlet 75 of the second turbine 69 may be connected with the outlet 73 of the first turbine 68. The second turbine 69 may also be located downstream of the second exhaust manifold 62 and upstream of the exhaust gas treatment device 76. The inlet 75 of the second turbine 69 may be connected with the second exhaust manifold 62. The outlet 73 of the first turbine 68 may be connected with the inlet 75 of the second turbine 69. The outlet 74 of the second turbine 69 may be connected with the exhaust gas treatment device 76.

The outlet 96 of the second compressor 94 may be connected with the inlet 90 of the first compressor 70. The outlet 92 of the first compressor 70 may be connected with an air intake system component, for example, the cooling unit 53. The inlet 98 of the second compressor 94 may draw air from the atmosphere and may be connected with other components, such as an air filter (not shown). Although not shown in FIG. 6, it is contemplated that a second cooling unit may be interposed between the outlet 96 of the second compressor 94 and the inlet 90 of the first compressor 70.

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the first turbine 68 of the first turbocharger 77 at the outlet 73. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the second turbine 69 of the second turbocharger 97 at the inlet 75. FIG. 6 shows an exemplary connection between the first portion 125 and the second portion 126 through a passageway 145.

The system 21 may further include a valve 85 interposed between the first exhaust branch 110 and the second exhaust branch 120. For example, the valve 85 may be connected with the first exhaust branch 110 downstream of the first exhaust manifold 60 and upstream of the inlet 81 of the turbo compounding device 64, and the second exhaust branch 120 downstream of the second exhaust manifold 62 and upstream of the inlet 75 of the second turbine 69.

Figure 7:
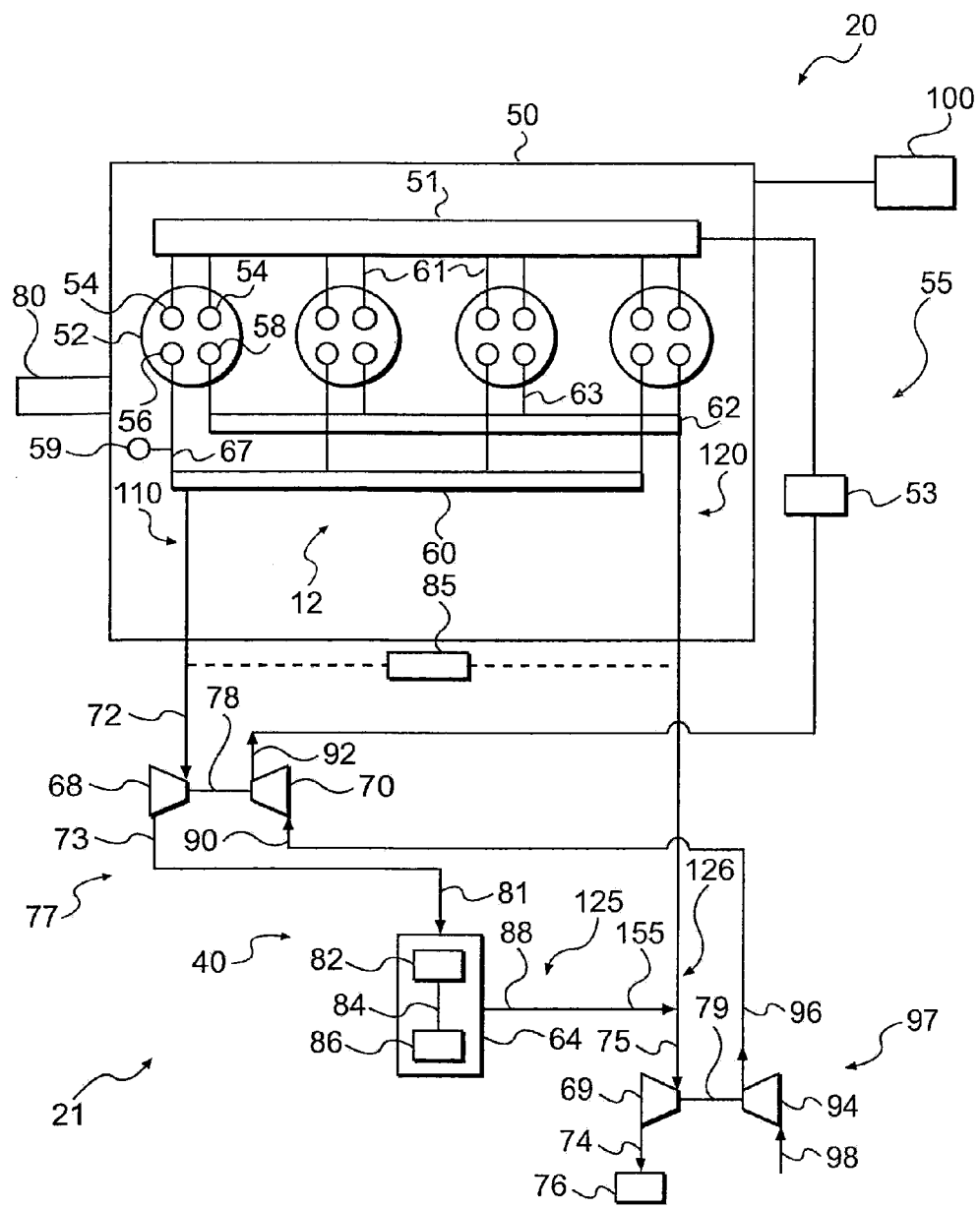
FIG. 7 is a diagrammatic representation of an engine system having a system for recovering engine exhaust energy in accordance with another embodiment.

FIG. 7 diagrammatically illustrates an exemplary engine system 20 having a system 21 for recovering engine exhaust energy in accordance with another embodiment. In FIG. 7, the engine system 20 may include the engine 50, the system 21, and components similar to those illustrated in FIG. 3. For example, the energy recovering assembly 40 may include the first turbocharger 77 including the first turbine 68 and the first compressor 70 and the second turbocharger 97 including the second turbine 69 and the second compressor 94.

The first turbine 68 may be located in the first exhaust branch 110 downstream of the first exhaust manifold 60. The inlet 72 of the first turbine 68 may be connected with the first exhaust manifold 60 to receive high pressure exhaust gases. The second turbine 69 may be located downstream of the second exhaust manifold 62 and upstream of the exhaust gas treatment device 76. The inlet 75 of the second turbine 69 may be connected with the second exhaust manifold 62. The outlet 74 of the second turbine 69 may be connected with the exhaust gas treatment device 76.

The energy recovering assembly 40 may include the turbo compounding device 64, which may be located in the first exhaust branch 110 downstream of the first turbine 68. The inlet 81 of the turbo compounding device 64 may be connected with the outlet 73 of the first turbine 68. The outlet 88 of the turbo compounding device 64 may be connected with the second exhaust branch 120 downstream of the second exhaust manifold 62 and upstream of the inlet 75 of the second turbine 69. The outlet 92 of the first compressor 70 may be connected with an air intake system component, for example, the cooling unit 53. The inlet 90 of the first compressor 70 may be connected with the outlet 96 of the second compressor 94. The inlet 98 of the second compressor 94 may draw air from the atmosphere, and may be connected with other components, such as an air filter (not shown).

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the second exhaust manifold 62 and upstream of the second turbine 69 of the second turbocharger 97 at the inlet 75. FIG. 7 shows an exemplary connection between the first portion 125 and the second portion 126 through a passageway 155.

The system 21 may further include a valve 85 interposed between the first exhaust branch 110 and the second exhaust branch 120. For example, the valve 85 may be connected with the first exhaust branch 110 downstream of the first exhaust manifold 60 and upstream of the inlet 72 of the first turbine 68, and the second exhaust branch 120 downstream of the second exhaust manifold 62 and upstream of the inlet 75 of the second turbine 69.

Figure 8:
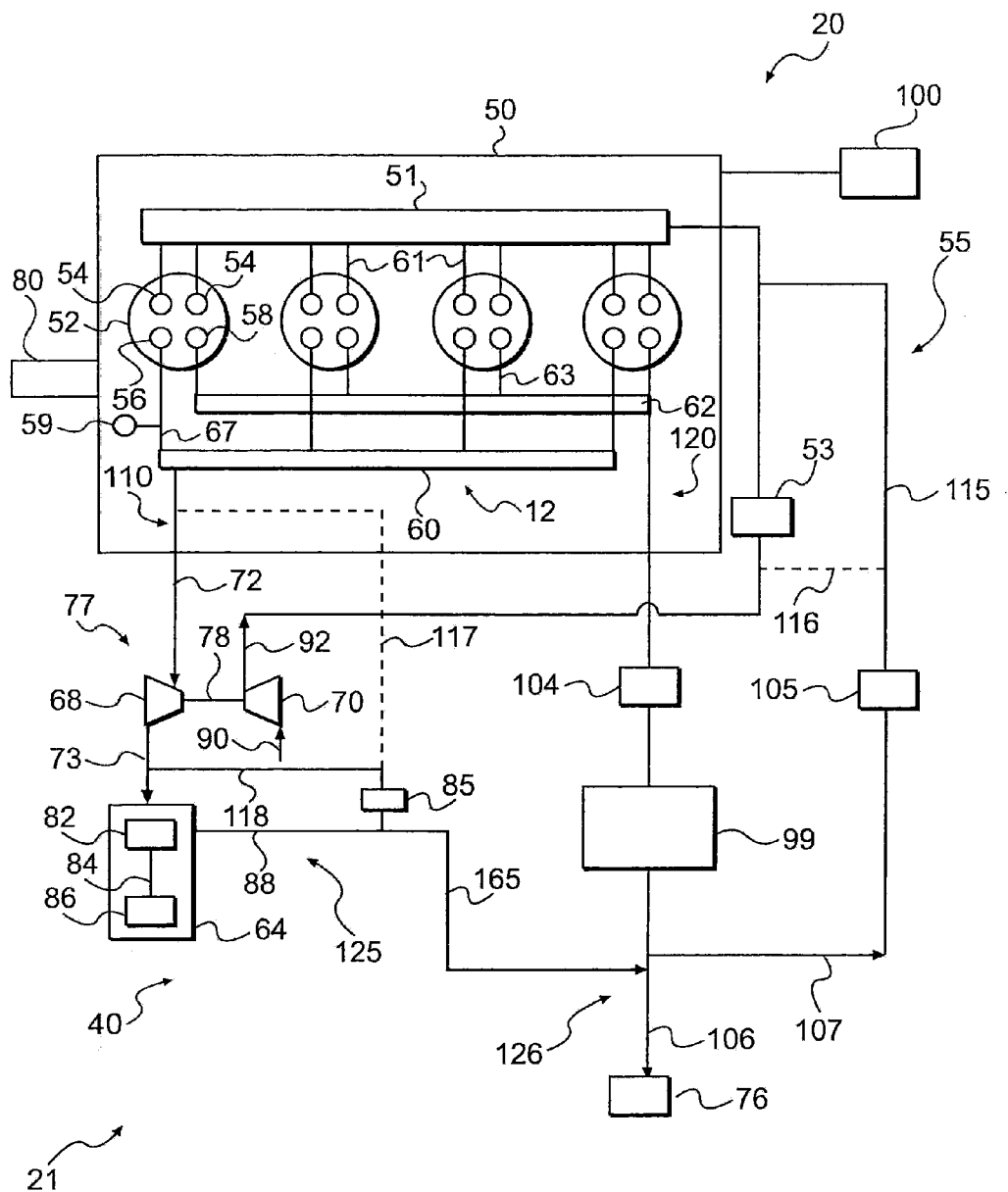
FIG. 8 is a diagrammatic representation of an engine system having a system for recovering engine exhaust energy in accordance with another embodiment.

FIG. 8 diagrammatically illustrates an exemplary engine system 20 having a system 21 for recovering engine exhaust energy in accordance with another embodiment. The engine system 20 may include the engine 50, the system 21, and components similar to those illustrated in FIGS. 2-7. The energy recovery assembly 40 may include the turbocharger 77 having turbine 68 and compressor 70, the turbo compounding device 64, and an exhaust waste heat recovery device 99. The turbocharger 77 may be located downstream of the first exhaust manifold 60 in the first exhaust branch 110. The inlet 72 of the turbine 68 may be connected with the first exhaust manifold 60 to receive exhaust gases. The turbo compounding device 64 may be located downstream of the turbocharger 77. The exhaust gas treatment device 76 may be located downstream of the turbo compounding device 64. In some embodiments, there may be a valve 85 located, for example, between a portion downstream of the outlet 73 and upstream of the turbo compounding device 64, and a portion downstream of the outlet 88 and upstream of the exhaust gas treatment device 76, as indicated by a passageway 118. The valve 85 also may be located between a portion downstream of the first exhaust manifold 60 and upstream of the turbine 68, and a portion downstream of the outlet 88 and upstream of the exhaust gas treatment device 76, as indicated by a passageway 117. The valve 85 may be opened at appropriate times to direct exhaust gases from the turbine 68 to the exhaust gas treatment device 76, bypassing the turbocharger 77 or the turbo compounding device 64. It is contemplated that in some embodiments, the turbocharger 77 may be located downstream of the turbo compounding device 64 in the first exhaust branch 110.

As shown in FIG. 8, the exhaust waste heat recovery device 99 may be located in the second exhaust branch 120 downstream of the second exhaust manifold 62. The exhaust waste heat recovery device 99 may be any known suitable waste heat recovery device. For example, the exhaust waste heat recovery device 99 may transfer thermal energy in exhaust gases into mechanical energy of a mechanical device, for example, a turbine (not shown). The turbine then may rotate and drive a compressor (not shown) to compress air. The exhaust waste heat recovery device 99 may also transfer thermal energy into electrical energy, which may be used, to drive various electrically powered engine components.

In some embodiments, there may be a filter 104 located in the second exhaust branch 120. For example, the filter 104 may be located downstream of the second exhaust manifold 62 and upstream of the exhaust waste heat recovery device 99. The filter 104 may also be located at other suitable locations, for example, downstream of the exhaust waste heat recovery device 99 and upstream of the exhaust gas treatment device 76. Alternatively, the filter 104 may be incorporated in the exhaust gas treatment device 76.

A portion of the exhaust gases from the exhaust waste heat recovery device 99 may flow to the exhaust gas treatment device 76 through a passageway 106. Another portion of the exhaust gases from the exhaust waste heat recovery device 99 may be directed back to the air intake system 55 through a passageway 107 and a valve 105. The valve 105 may be located between the exhaust waste heat recovery device 99 and the intake manifold 51. The valve 105 may be connected with the exhaust waste heat recovery device 99 through the passageway 107 and with the intake manifold 51 through a passageway 115. It is contemplated that the valve 105 may also be located between the exhaust waste heat recovery device 99 and the cooling unit 53. The valve 105 may be connected with the cooling unit 53 through a passageway 116. The portion of exhaust gases directed back to the air intake system 55 may be subsequently directed into the engine cylinder 52 for combustion. The valve 105 may be adjustable to control the amount of the portion of exhaust gases directed back to the air intake system 55.

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the exhaust waste heat recovery device 99 and upstream of the exhaust gas treatment device 76. FIG. 8 shows an exemplary connection between the first portion 125 and the second portion 126 through a passageway 165.

Figure 9:
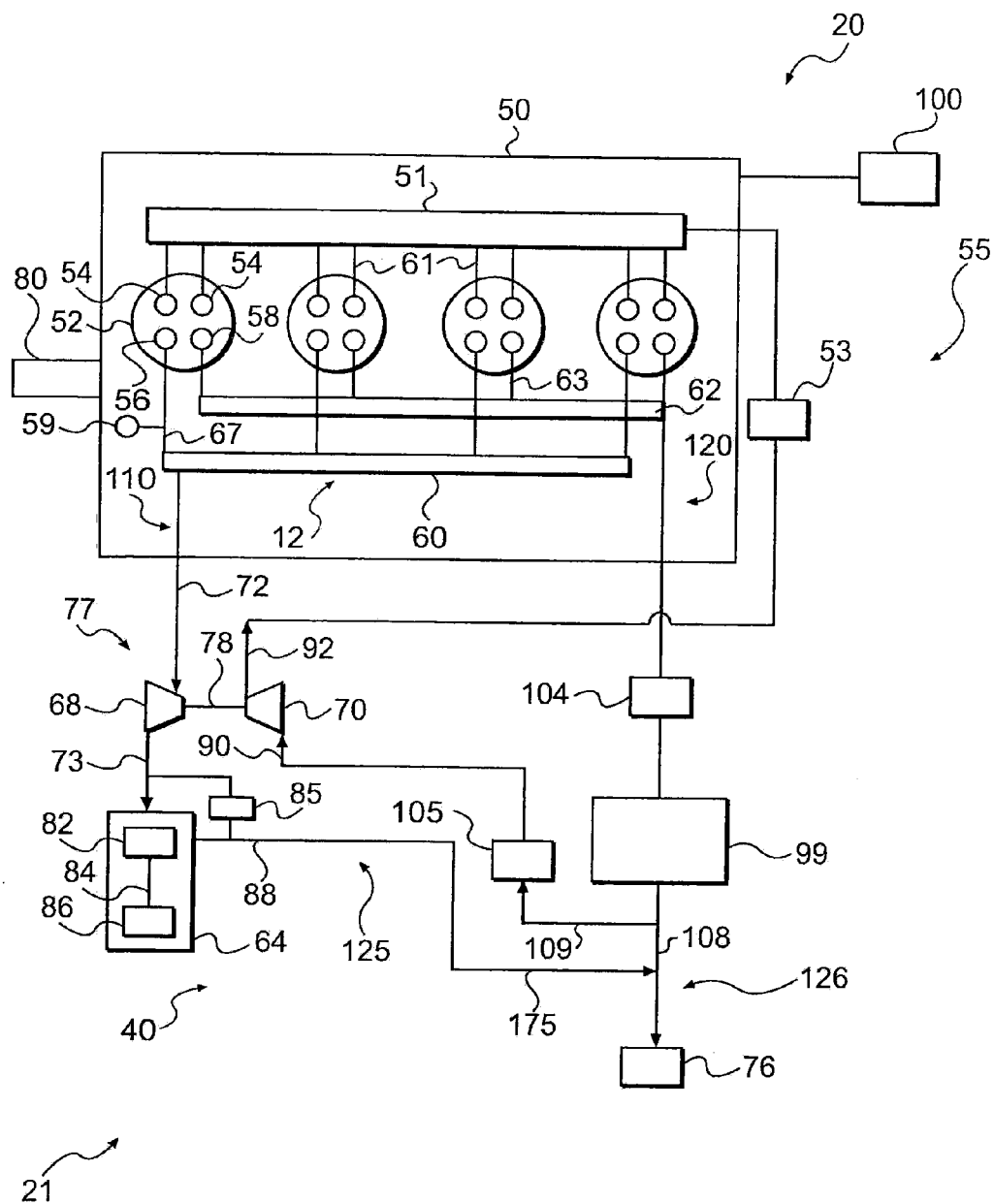
FIG. 9 is a diagrammatic representation of an engine system having a system for recovering engine exhaust energy in accordance with another embodiment.

FIG. 9 shows another embodiment similar to the one shown in FIG. 8. Similar components may be identified by the same reference numerals in the embodiments of both FIG. 8 and FIG. 9. As FIG. 9 illustrates, a portion of the exhaust gases from the exhaust waste heat recovery device 99 may be directed to the exhaust gas treatment device 76 through a passageway 108, and another portion of the exhaust gases may be directed back to the air intake system 55 through a passageway 109 and the valve 105. In this embodiment, the valve 105 may be located between the exhaust waste heat recovery device 99 and the inlet 90 of the compressor 70. Therefore, this portion of exhaust gases may be compressed by the compressor 70. Similar to the embodiment shown in FIG. 8, there may be a filter 104 located downstream of the first exhaust manifold 62 and the exhaust waste heat recovery device 99. The filter 104 may also be located at other suitable locations, for example, between exhaust waste heat recovery device 99 and exhaust gas treatment device 76. Alternatively, the filter 104 may be incorporated with the exhaust gas treatment device 76. It is contemplated that in some embodiments, the turbocharger 77 may be located downstream of the turbo compounding device 64 in the first exhaust branch 110.

The first portion 125 of the first exhaust branch 110 in fluid communication with the second portion 126 of the second exhaust branch 120 may be located at any suitable locations downstream of the first exhaust manifold 60. For example, the first portion 125 may be located downstream of the turbine 82 of the turbo compounding device 64 at the outlet 88. The second portion 126 of the second exhaust branch 120 may be located at various suitable locations in the second exhaust branch 120 downstream of the second exhaust manifold 62. For example, the second portion 126 may be located downstream of the exhaust waste heat recovery device 99 and upstream of the exhaust gas treatment device 76. FIG. 9 shows an exemplary connection between the first portion 125 and the second portion 126 through a passageway 175.

In all exemplary embodiments described in FIGS. 2-9, the system 21 may include a sensor 59 and a control mechanism 100. The sensor 59 may be suitably located and configured to measure at least one engine operating parameter, such as an exhaust gas pressure, an air/fuel ratio, engine speed, engine load, ambient temperature and ambient pressure, boost pressure, etc. Alternatively, some of these parameters, such as the exhaust gas pressure and the air/fuel ratio, may not be directly measured by the sensor 59, but may be calculated based on other parameters measured by the sensor 59. Although the sensor 59 is shown to be located adjacent the first exhaust manifold 60 to measure exhaust gas pressure, it is contemplated that the sensor 59 may be suitably located when configured to measure other engine operating parameters. The control mechanism 100 may be a mechanical, electrical, hydraulic, or pneumatic control mechanism, and may be configured to control valves, such as the second group of exhaust valves 58, according to a determined timing strategy based on the at least one engine operating parameter. In some embodiments, the first group of exhaust valves 56 and the intake valves 54 may also be controlled independently by the control mechanism 100.

The control mechanism 100 may be configured, for example, through a programmable controller included in the control mechanism 100 to execute the determined timing strategy. The sensor 59 may be associated with the control mechanism 100. Upon receiving the engine operating parameter data measured by the sensor 59, the control mechanism 100 may analyze the measured engine operating parameter data, and utilize the data in determining and executing the timing control strategy.

INDUSTRIAL APPLICABILITY

The disclosed system 21 for recovering engine exhaust energy may be applicable to any machine that uses an internal combustion engine to generate power. The internal combustion engine may be, for example, a spark ignited gasoline engine, a natural gas engine, or a diesel engine. The system 21 in accordance with the disclosed embodiments may be used to recover energy from exhaust gases and therefore may increase overall engine combustion efficiency. By controlling valves such as the second group of exhaust valves 58 according to a determined timing strategy through the control mechanism 100, exhaust energy may be recovered efficiently using an exhaust energy recovering assembly 40, which may include a turbine (e.g., turbine 82), while adverse effects associated with high back pressure generated by the turbine may be eliminated, or at least significantly reduced. With increased combustion efficiency, fuel economy of an engine system may be significantly improved.

References will be made to FIGS. 2-9 in the following discussion. Engine 50 may be an internal combustion engine that combusts a mixture of air and fuel to produce power in the combustion chambers of the cylinders 52. Intake valves 54 may be opened and closed to allow and block air flow from the air intake manifold 51 into the combustion chamber. The first group of exhaust valves 56 may be opened and closed to allow and block exhaust gas flow from the cylinders 52 to the first exhaust manifold 60. The second group of exhaust valves 58 may be opened and closed to allow and block exhaust gas flow from the cylinder 52 to the second exhaust manifold 62.

The turbo compounding device 64 and turbochargers (e.g., turbochargers 77 and 97) may be used to recover energy from the exhaust gases. Exhaust gases may cause turbine 82 of the turbo compounding device 64, or turbine 68 (or 69) of the first (or second) turbocharger 77 (or 97) to rotate. Rotating turbine 82 may cause shaft 84 to rotate. The power coupling device 86 may convert mechanical energy of the rotating turbine 82 into energy for other devices or other forms of energy. The power coupling device 86 may be a mechanical device, which may couple energy of the rotating turbine 82 to the drive output device 80 of the engine 50, for example, a crankshaft. The power coupling device 86 may also be an electrical device, which may include, for example, a generator, to convert mechanical energy of the rotating turbine 82 into electrical energy. The converted electrical energy may then be associated with the drive output device 80 of the engine 50. The rotating turbine 68 (or 69) may cause compressor 70 (or 94) to rotate, which may compress air.

Air compressed by the compressor 70 (or 94) may then be directed to the cooling unit 53, which may reduce the temperature of the compressed air before it enters the intake manifold 51 and the combustion chambers for combustion. With the compressors 70 and 94 and the cooling unit 53, more air may be compressed and drawn into the combustion chambers for combustion. Therefore, more power may be produced by the engine 50 during an engine cycle. The exhaust gas treatment device 76 may be used to treat the exhaust gases, for example, to reduce particulate matter, or to convert toxic gases into nontoxic gases, etc.

The valve 85 interposed between the first exhaust branch 110 and the second exhaust branch 120 may open to direct exhaust gases from the first exhaust branch 110 to the second exhaust branch 120. Therefore, the valve 85 may be used to bypass turbines located in the first exhaust branch 110, for example, the turbine 82 of the turbo compounding device 64 as shown in FIG. 2. The valve 85 may be used to improve engine response under some circumstances.

The exhaust waste heat recovery device 99 may be used to convert thermal energy of exhaust gases into other forms of energy, for example, mechanical energy or electrical energy. The filter 104 may be used to clean exhaust gases, for example, before exhaust gases flow into the exhaust waste heat recovery device 99. The valve 105 may be used to controllably direct a portion of exhaust gases from the exhaust waste heat recovery device 99 into the air intake system 55 and subsequently the engine cylinders 52 for combustion.

Exhaust gases produced by the engine 50 may be directed from the plurality of engine cylinders 52 through the first group of exhaust valves 56 and into the first exhaust manifold 60 in the first exhaust branch 110 of the exhaust system 12, and may be directed from the plurality of engine cylinders 52 through the second group of exhaust valves 58 and into the second exhaust manifold 62 in the second exhaust branch 120 of the exhaust system 12. Exhaust gases may be directed to one or more turbo compounding devices, turbochargers, exhaust waste recovery devices, and other exhaust system components arranged in different configurations, as shown in the disclosed embodiments in FIGS. 2-9.

The control mechanism 100 (shown in FIGS. 2-9) may be used to control the operation of valves such as the second group of exhaust valves 58. In some embodiments, control mechanism 100 may also be used to control the operation of the intake valves 54 and the first group of exhaust valves 56. The control mechanism 100 may be configured to implement a timing strategy for operating the second group of exhaust valves 58, and may be configured to analyze various parameters of the system 21 to determine and execute the timing strategy.

For example, the sensor 59 may be a pressure sensor located between the first exhaust manifold 60 and the first group of exhaust valves 56 may measure a parameter indicative of pressure of the exhaust gases therein, which may be affected by the back pressure generated by a turbine. Upon receiving and analyzing the pressure measurement taken by the sensor 59, the control mechanism 100 may determine a timing strategy for the valves, such as the second group of exhaust valves 58. For another example, the sensor 59 may be a sensor configured to measure an air/fuel ratio associated with the engine 50. A timing strategy may be constructed based on at least the measured air/fuel ratio so that the valve timing may be adjusted in order to maintain the air/fuel ratio at a determined level to prevent high particulate levels in the case of a diesel engine 50, or to maintain stoichiometry in the case of a spark ignited engine 50. Other timing strategies may be contemplated, for example, based on maintaining a determined engine efficiency level.

In order to fully utilize turbo compounding devices and turbochargers to recover energy from exhaust gases, the first group of exhaust valves 56 and the second group of exhaust valves 58 must be controlled to be opened and closed at appropriate times. An appropriate timing strategy may help recover as much energy as possible while eliminating or at least reducing adverse effects associated with high back pressure. An appropriate timing strategy may be dependent on engine status and needs. Therefore, various timing schemes may be used for the system 21 shown in FIGS. 2-9.

Figure 10:
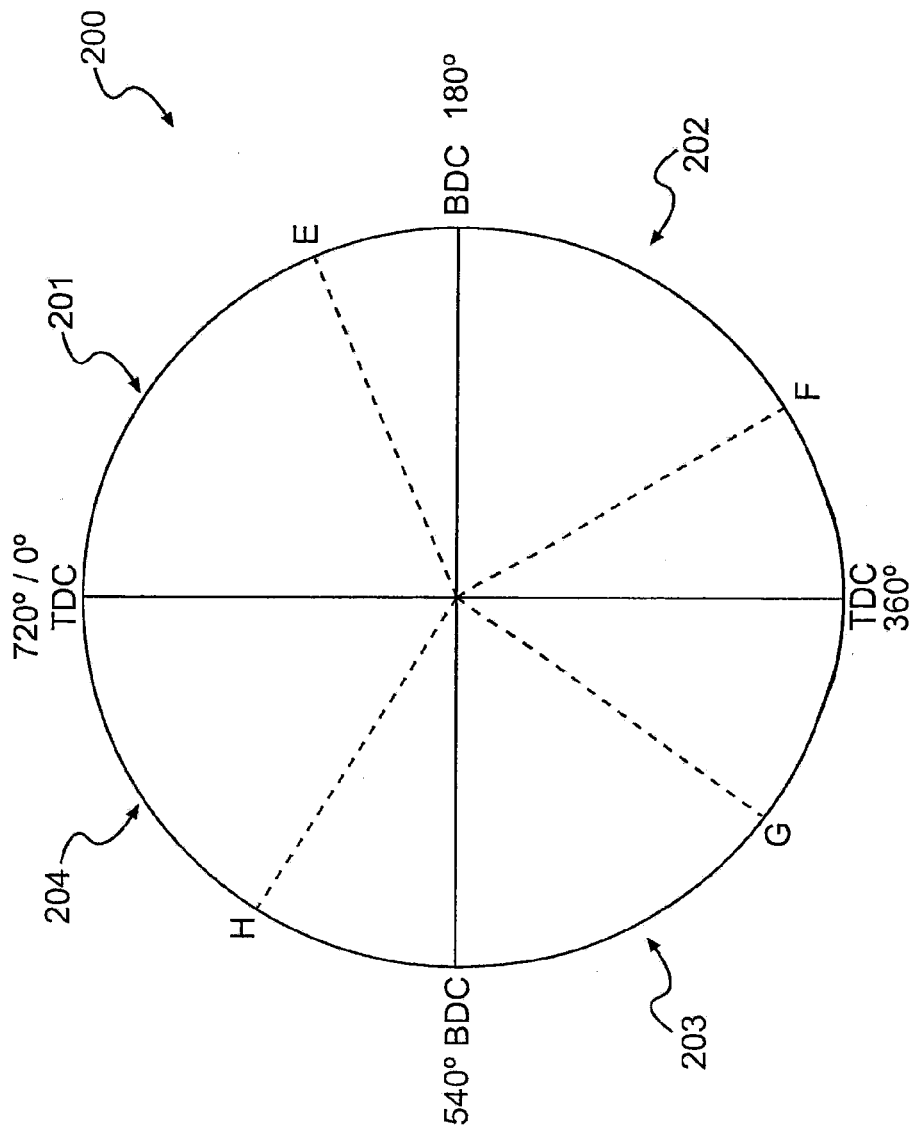
FIG. 10 is an exemplary valve timing diagram.

FIG. 10 schematically shows an exemplary valve timing diagram 200 for a four-stroke engine cycle in accordance with disclosed embodiments. The circle in FIG. 10 represents a full engine cycle including four piston strokes. Points on the circle represent possible positions of the piston traveling inside the cylinder 52 from a top dead center (TDC) position to a bottom dead center (BDC) position. The four quadrants of the circle in diagram 200 represent the expansion stroke 201, exhaust stroke 202, intake stroke 203, and compression stroke 204. The progression of the four strokes in a four-stroke cycle in FIG. 10 is clockwise. In FIG. 10, expansion stroke 201 begins at zero crank-angle degrees (TDC), and ends at 180 degrees (BDC). Exhaust stroke 202 begins at 180 degrees (BDC) and ends at 360 degrees (TDC). Intake stroke 203 begins at 360 degrees (TDC) and ends at 540 degrees (BDC). Compression stroke 204 begins at 540 degrees (BDC) and ends at 720 degrees (TDC). Thus, the engine crankshaft travels through two complete rotations (720 degrees) as the piston travels within the engine cylinder 52 through a four-stroke cycle.

As the piston travels during expansion stroke 201, the first group of exhaust valves 56 may be opened at point E, for example, to direct high pressure exhaust gases to the first exhaust branch 110. As the piston travels during exhaust stroke 202, the first group of exhaust valves 56 may be closed or maintained open at point F, and at approximately the same time, the second group of exhaust valves 58 may be opened. In some embodiments, there may be some overlap between the closing of the first group of exhaust valves 56 and the opening, of the second exhaust valves 58. Low pressure exhaust gases may be directed to the second exhaust branch 120 through the second group of exhaust valves 58.

As the piston travels during intake stroke 203, the second group of exhaust valves 58 may be closed at point G. Intake valves 54 may be opened at various times, for example, at times between points F and G, to intake air for combustion. Intake valves 54 may be closed at various times, for example, at point H during compression stroke 204, permitting a mixture of air and fuel to be compressed and then ignited, for example at or near TDC for combustion. The four-stroke engine cycle may then repeat.

The time to open the first group of exhaust valves 56 (e.g., point E) may be determined by the control mechanism 100 based on various parameters, such as, parameters indicative of engine status including, for example, engine speed, engine loads, exhaust gas pressure, etc. The following discussion represents an exemplary embodiment of timing strategy. Point E may indicate a nominal time for opening the first group of exhaust valves 56, for example, under a determined normal condition of the engine 50. However, under some conditions other than the determined normal condition, the first group of exhaust valves 56 may be opened earlier or later than point E. For example, under some circumstances, back pressure generated by a turbine of a turbo compounding device or a turbocharger located downstream of the first exhaust manifold 60 may accumulate, and exhaust gas pressure between the first exhaust manifold 60 and the first group of exhaust valves 56 may be increased. This increased exhaust pressure may be detected by the sensor 59.

Upon receiving a signal indicative of the pressure measured by the sensor 59, control mechanism 100 may analyze the pressure to determine a timing strategy. For example, the control mechanism 100 may determine that it is appropriate to open the first group of exhaust valves 56 earlier than point E in order that the high back pressure may be favorably utilized in the late portion of the expansion stroke 201. The high back pressure may help improve energy recovery during engine blow down when the first group of exhaust valves 56 are opened. It is possible that high back pressure may exert additional pressure on the piston, and may assist piston travel and produce more positive work, which may further yield more engine power output. High back pressure may also result in an increase in exhaust gas temperature, and it may increase the pressure drop across the energy recovering assembly. This may potentially enable more exhaust energy to be recovered.

In some circumstances, when the pressure measured by the sensor 59 indicates that the exhaust gas pressure has reached a determined level, the control mechanism 100 may determine that it is appropriate to change the opening and closing times of the valves to eliminate adverse effects associated with the back pressure generated by a turbine, for example in order to improve air intake efficiency. For example, after analyzing the pressure measurement by the sensor 59, the control mechanism 100 may close the first group of exhaust valves 56 earlier than point F, open the second group of exhaust valves 58 earlier than point F, and close the second group of exhaust valves 58 later than point G, and open the intake valves 54 earlier than point G. By closing the first group of exhaust valves 56 earlier than point F and opening the second group of exhaust valves 58 earlier than point F, more exhaust gases may be discharged to the second exhaust branch 120, thus ensuring better cylinder scavenging and more space for air intake. By opening the intake valves 54 earlier than point G and closing the second group of exhaust valves 58 later than point G, more fresh air may be taken into the cylinder 52, and more exhaust residual gases may be expelled out of the cylinder 52. Air intake may be more efficient. Piston pumping work may also be reduced.

Timing strategies for controlling the opening and closing of the valves may vary depending on the actual status and needs of the engine 50. In some embodiments, the first group of exhaust valves 56 may be opened at approximately 120 degrees after TDC during the expansion stroke 201 at approximately point E. The first group of exhaust valves 56 may be closed at any appropriate point between BDC and TDC during the exhaust stroke 202 consistent with efficient engine operation. Therefore, the angle between BDC and point F may be a reasonable angle between 0 to 180 degrees, e.g., 120 degrees. Similarly, the second group of exhaust valves 58 may be opened at any point between BDC and TDC during the exhaust stroke 202, and the time the second group of exhaust valves 58 are opened may not be the same as when the first group of exhaust valves 56 are closed. In other words, the time to open the second group of exhaust valves 58 may be earlier or later than the time to close the first group of exhaust valves 56.

The second group of exhaust valves 58 may be closed after TDC during the intake stroke 203, for example, at point G. The angle between TDC and point G may be any reasonable angle, for example, 5 degrees, 15 degrees, etc., depending on engine status and needs. At the time the second group of exhaust valves 58 are closed, intake valves 54 may be opened. However, the time to open intake valves 54 may be earlier or later than the time to close the second group of exhaust valves 58. For example, intake valves 54 may be opened before TDC of exhaust stroke 202. Intake valves 54 may be closed at any point between BDC and TDC during the compression stroke 204, or at any point before BDC of the intake stroke 203, depending on engine status and needs. The angle between BDC and point H during the compression stroke 204 may be any reasonable angle, for example, 30 degrees, 40 degrees, etc.

The disclosed system 21 may be configured to allow efficient recovering of waste energy from exhaust gases. By utilizing engine exhaust energy recovering assemblies such as turbo compounding devices, turbochargers, and waste heat recovery devices, as well as a control mechanism to control timing of valves such as the first and second groups of exhaust valves appropriately, a significant portion of waste energy may be recovered from exhaust gases. Furthermore, through a proper timing control strategy based on at least the exhaust gas pressure, high back pressure generated by turbines of turbo compounding devices and turbochargers may be favorably utilized to capture as much energy as possible from combustion during an engine cycle, while its adverse effects may be eliminated or at least significantly reduced. Thermal energy of the exhaust gases may also be recovered by the exhaust waste heat recovery device. The disclosed system 21 may produce significantly improved overall engine combustion efficiency.

It will be apparent to those skilled in the art that various modifications and variations can be made in the disclosed system for recovering engine exhaust energy. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A system for recovering engine exhaust energy, comprising:
    an exhaust system including a first exhaust branch and a second exhaust branch, a portion of the first exhaust branch being in fluid communication with a portion of the second exhaust branch;
    a first group of exhaust valves and a second group of exhaust valves associated with a plurality of engine cylinders;
    a first exhaust energy recovering assembly and a second exhaust energy recovering assembly fluidly connected in series and configured to recover energy from exhaust gases in the second exhaust branch; and
    a control mechanism configured to control at least one of the first group of exhaust valves and the second group of exhaust valves according to a determined timing strategy based on at least one engine operating parameter so that a pressure of exhaust gas received by the first exhaust branch is higher than a pressure of exhaust gas received by the second exhaust branch,
    wherein the portion of the second exhaust branch is located downstream of the first exhaust energy recovering assembly and the second exhaust energy recovering assembly.

2. The system of claim 1, further comprising a valve interposed between the first exhaust branch and the second exhaust branch.

3. The system of claim 1, wherein at least one of the first exhaust energy recovering assembly and the second exhaust energy recovering assembly includes an exhaust waste heat recovery device.

4. The system of claim 1,
    wherein the first exhaust energy recovering assembly includes a first turbocharger having a first turbine and a first compressor, and
    wherein the second exhaust energy recovering assembly includes a second turbocharger having a second turbine and a second compressor.

5. The system of claim 1, wherein the portion of the first exhaust branch is located downstream of a first exhaust manifold and upstream of an exhaust gas treatment device.

* * * * *